(12) United States Patent
Domange et al.

(10) Patent No.: US 7,131,786 B2
(45) Date of Patent: Nov. 7, 2006

(54) PROCESS AND DEVICE FOR THE DAMPING OF MOTION BETWEEN TWO CYLINDRICAL PARTS SLIDING WITH ONE ANOTHER IN TRANSLATION AND FRICTION

(75) Inventors: Bruno Domange, Maisons-Laffitte (FR); Eric Costes, Paris (FR)

(73) Assignee: Enidine GmbH, Bad Bellingen-Rheinweiler (DE)

( * ) Notice: Subject to any disclaimer, the term of this patent is extended or adjusted under 35 U.S.C. 154(b) by 0 days.

(21) Appl. No.: 10/197,875

(22) Filed: Jul. 19, 2002

(65) Prior Publication Data

US 2003/0026650 A1    Feb. 6, 2003

(30) Foreign Application Priority Data

Jul. 20, 2001    (FR) .................................. 01 09737

(51) Int. Cl.
F16F 7/09    (2006.01)
(52) U.S. Cl. .................. 403/366; 403/372; 188/381
(58) Field of Classification Search ............... 403/365, 403/366, 372, 376; 104/249, 254; 188/129, 188/381; 29/896.93
See application file for complete search history.

(56) References Cited

U.S. PATENT DOCUMENTS

| 1,713,515 | A | * | 5/1929 | Bechereau ................... 188/129 |
| 2,010,623 | A | * | 8/1935 | Bugatti ....................... 267/203 |
| 2,615,535 | A |   | 10/1952 | Snyder |
| 3,059,916 | A |   | 10/1962 | Fahlbush et al. |
| 3,332,523 | A | * | 7/1967 | Chambers ................... 188/129 |
| 3,382,955 | A |   | 5/1968 | Deyerling |
| 5,560,162 | A | * | 10/1996 | Kemeny ..................... 52/167.3 |
| 5,655,632 | A | * | 8/1997 | Valembois .................. 188/136 |
| 6,279,693 | B1 | * | 8/2001 | Wiebe ........................ 188/129 |
| 6,386,528 | B1 | * | 5/2002 | Thorn et al. ................ 267/201 |
| 6,497,632 | B1 | * | 12/2002 | Ayukawa et al. ........... 474/135 |

FOREIGN PATENT DOCUMENTS

| DE | 1914878 | * | 10/1969 |
| DE | 2158382 |   | 5/1973 |
| DE | 25 24 592 A1 |  | 12/1976 |
| DE | 43 04 389 A1 |  | 8/1994 |
| EP | 0 198 179 A1 |  | 10/1986 |
| EP | 0 702 165 A2 |  | 3/1996 |
| JP | 59040041 A | * | 3/1984 |

* cited by examiner

Primary Examiner—James R. Brittain
(74) Attorney, Agent, or Firm—Rothwell, Figg, Ernst & Manbeck

(57) ABSTRACT

This invention relates to a process and a device for the damping of motion between two cylindrical parts sliding with one another in translation and friction.

According to this invention, the damping is performed by the application of a force exerted radially perpendicularly to the translation motion of the two parts by at least one elastic segment (13) circling one of the parts (11) and inside the other (12), integral in translation with one of the parts (11) and appplying said frictional force on the other part (12).

This invention is applicable to the absorption of shocks as well as to that of vibrations.

3 Claims, 5 Drawing Sheets

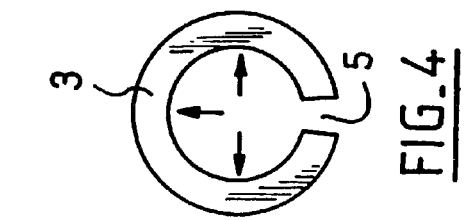
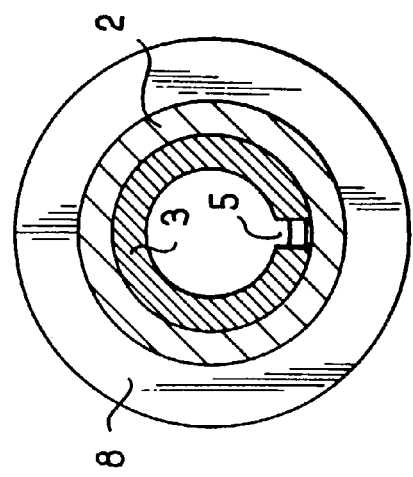
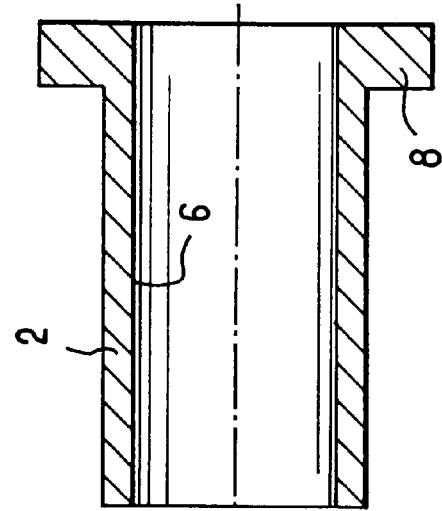
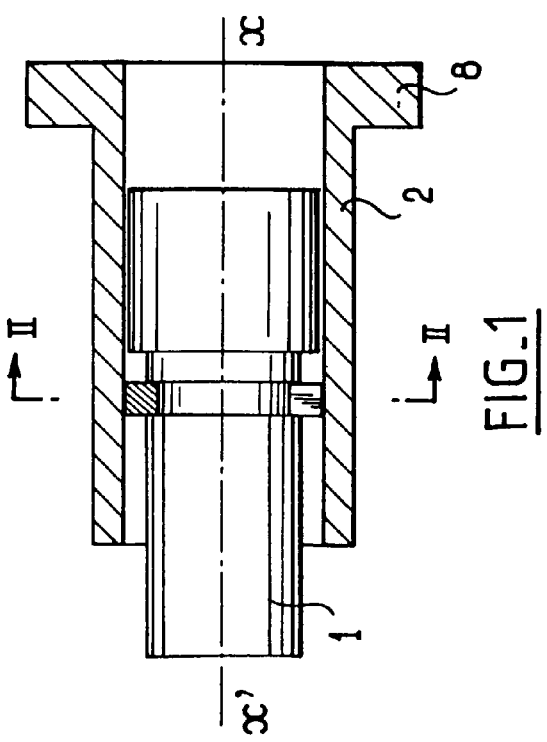
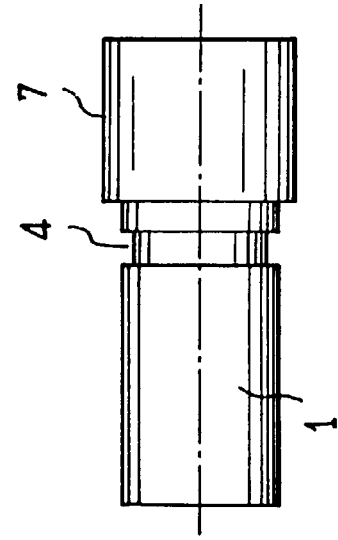

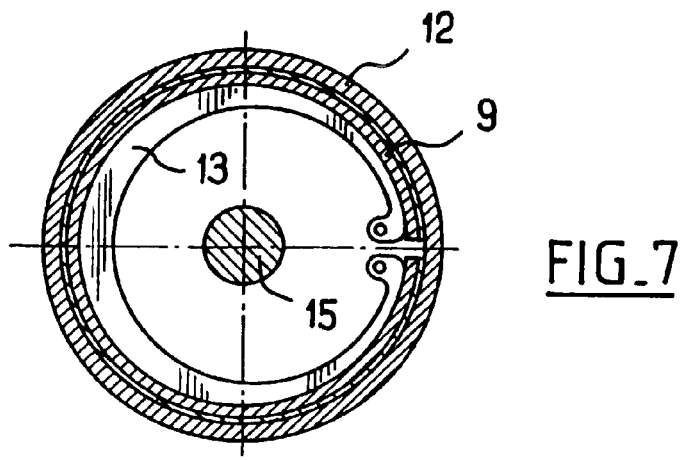
FIG_7
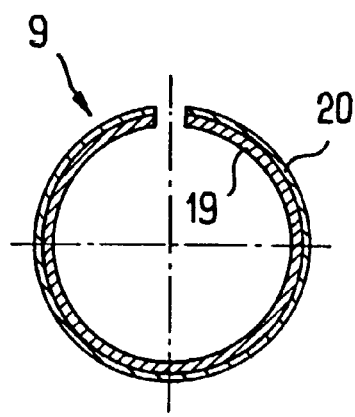
FIG_8
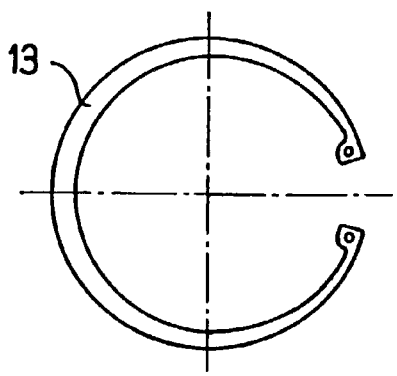
FIG_9
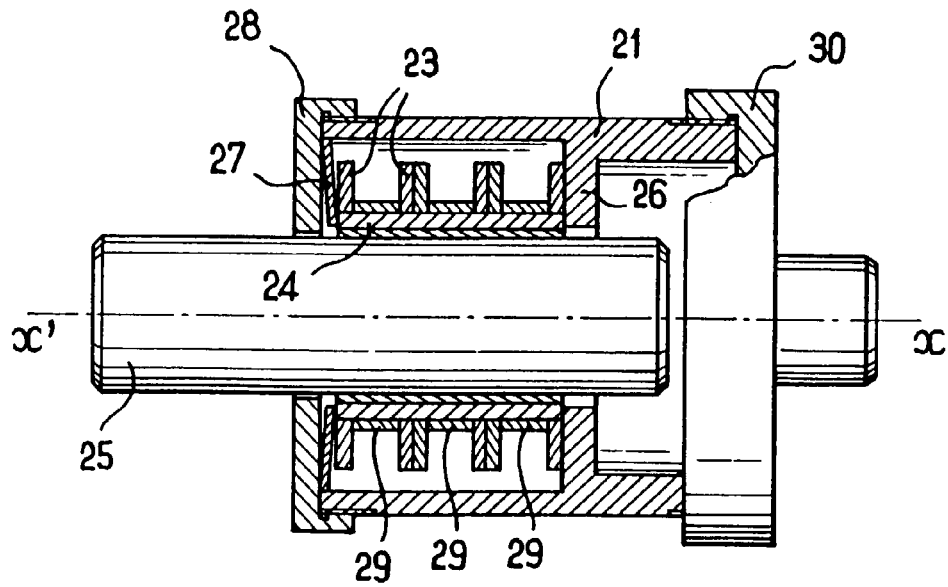
FIG_10

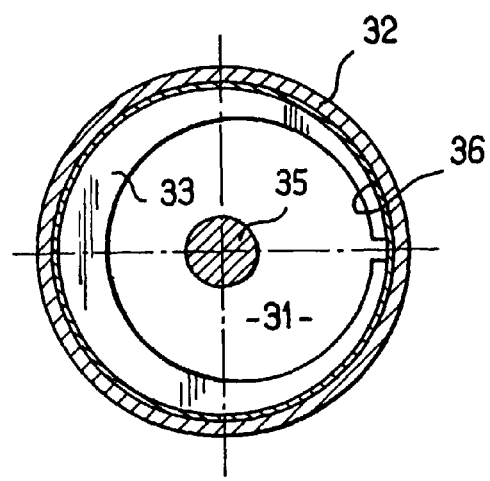
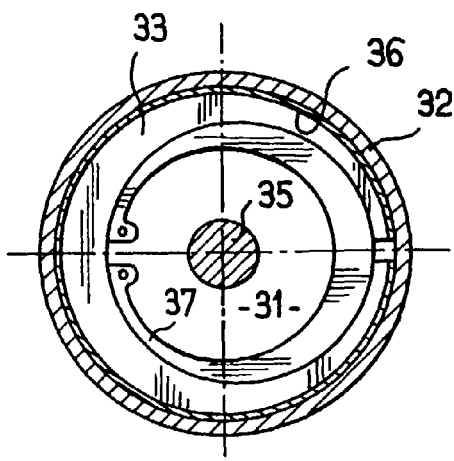
FIG_11
FIG_12
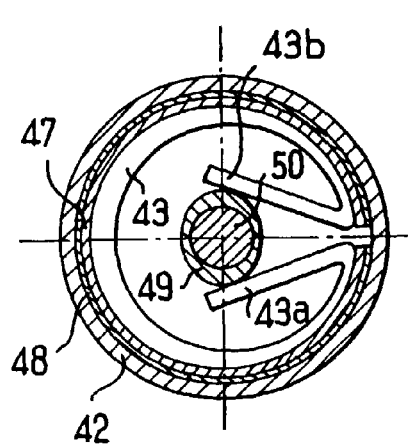
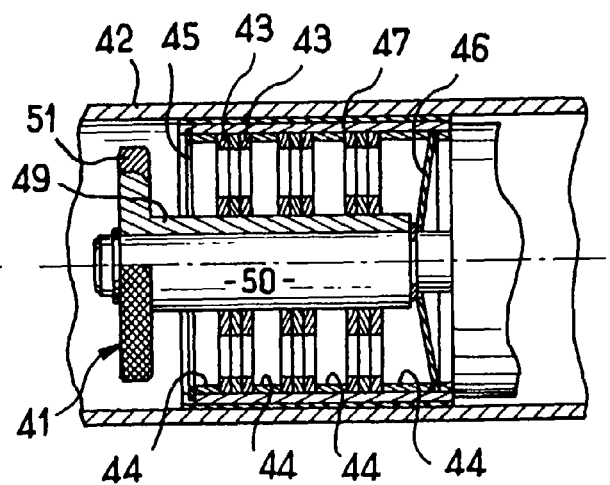
FIG_14
FIG_13

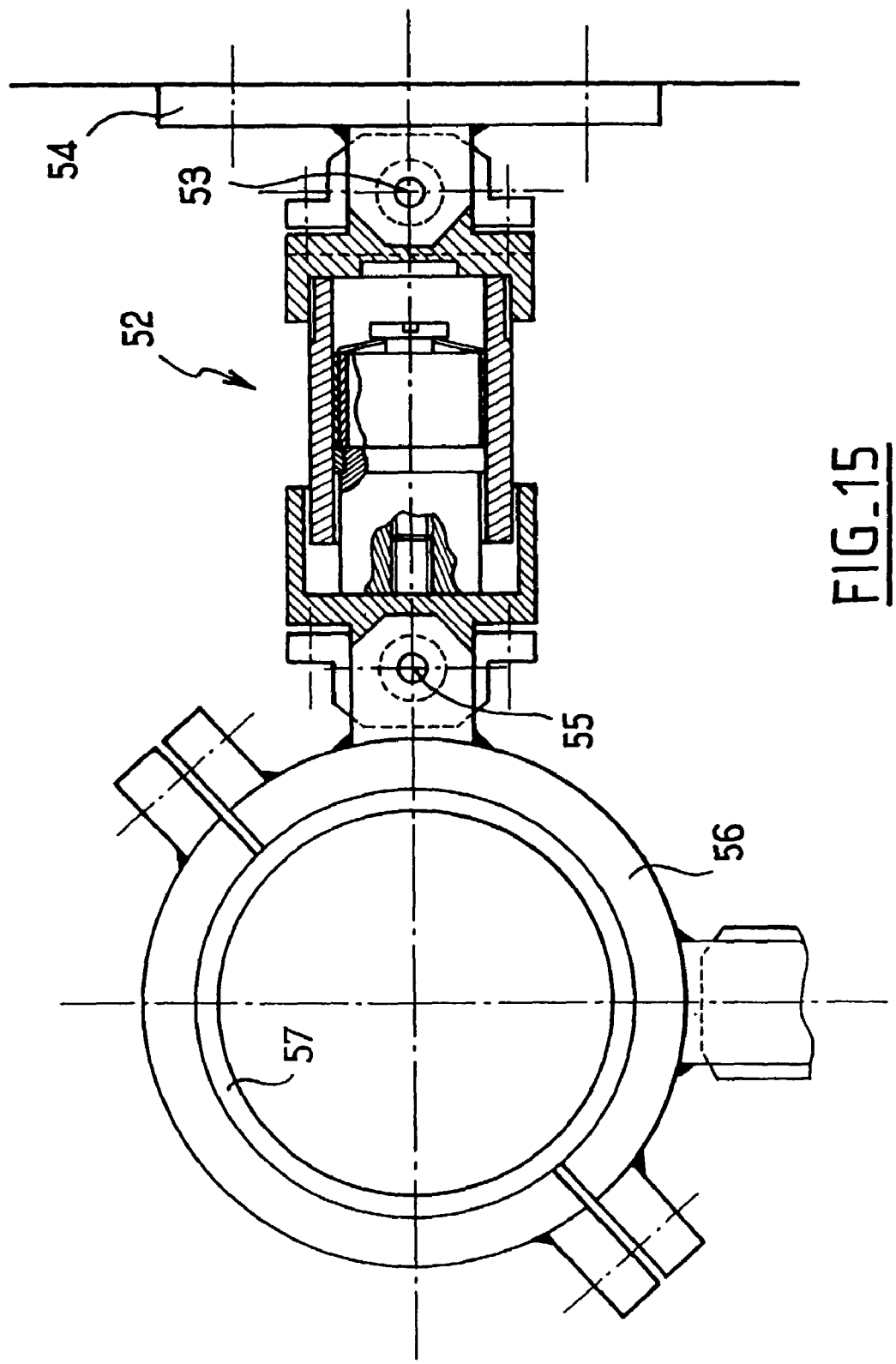
FIG_15

PROCESS AND DEVICE FOR THE DAMPING OF MOTION BETWEEN TWO CYLINDRICAL PARTS SLIDING WITH ONE ANOTHER IN TRANSLATION AND FRICTION

This invention relates essentially to a process and a device for the damping of movement and/or vibration, and/or for shock absorption between two parts, of which one could be a structure (e.g. a stopper, a fixation wall) on which the damping will take place, and the other one will be the part (e.g. a carriage, a tube or conduit) of which the movement, the shock received, or the vibration, must be dampened, or else between two interconnected parts, e.g. a structure of a plane wing.

Shock absorbing systems are necessary for instance in the railroad industry to damp the shock of a carriage against a stopper. There are many technologies for implementing such damping devices: hydraulic, pneumatic, visco-elastic, frictional, etc. Said systems are characterized in that they must absorb very quickly but with a very low periodicity, considerable efforts and energies. Typically, such efforts to be dissipated are in the range of a few kilojoules to a few megajoules, while the number of cycles is typically reduced to a few hundred cycles in a few days, or even in a few months.

Vibration damping systems are characterized by their amplitude and frequency. These two values may vary as time goes on. The energies generated by rotating machines, fluid flows, external influences, for instance meteorological (vibrations of a suspension bridge), etc., can generate vibrating motions of great amplitude under the well-known phenomenon of resonance. There too, we have many technologies to implement damping devices, of the hydraulic, pneumatic, viscoelastic, frictional, etc. type in particular. Unlike in the case of shocks, the energy dissipation for each cycle is low, typically a few joules, but the number of operating cycles is usually high, typically from a few hundred to a few thousand cycles per minute.

Under these conditions, it is clear that the systems used for damping vibrations and shocks generally operate in very different ways, although they may necessitate over time the dissipation of comparable energies, even when the immediate/instantaneous energy dissipation is very different.

This invention offers a new solution that can actually be adapted to all the motion-damping devices, whether they act upon immediate shocks requiring the damping of a great amount of energy, or upon repeated shocks or vibrations with a low (even very low) amplitude but with a more or less important frequency, requiring here again the damping over time of great energies.

This invention thus offers a process for the damping of motion and/or shocks and/or vibrations between two cylindrical parts sliding with each other in translation and friction, characterized in that the damping is implemented by applying a radial force perpendicularly to translation motion of the two parts by means of at least one elastic segment circling one of the parts and located inside the other, integral in translation with one of the parts and applying said frictional force on the other part.

According to another characteristic of the process of this invention, means are provided that enable to vary the radial force.

The device for the implementation of the process of this invention is itself characterized in that at least one elastic segment made of steel or the like is mounted integral with one of the parts and acts upon a friction sleeve possibly coated with a friction material that said segment applies with a radial distortion upon the cylindrical surface facing the second part. An alloy such as cupro-beryllium is particularly suitable.

The device is preferably characterized in that it comprises several segments tightly mounted on said first part inside a housing integral with that part. Advantageously, the segments are distributed axially along said first part by means, for instance, of spacing rings, although in some applications such rings may be omitted.

With such a general arrangement, it is noted that, given the extreme axial rigidity of the segments that enables to develop very quickly an effort opposed to the motion, it is possible to obtain, in extreme cases, much quicker system response times than could be obtained with devices in which one depends to some extent on the elasticity of the materials and/or the fluids used, making such devices particularly unfit in for the damping of vibratory motions of very low amplidude such as a few tenths of a millimeter for instance.

Another great advantage of this invention is that the damping thus obtained is essentially independent of the speed of the actuation, e.g. from 0 to 200 m/s, and also of the operating temperature to which the system may be exposed, and this within a very broad range, from $-200°$ C. to $+200°$ C. for example.

The invention and its implementation will become more apparent from the following description, together with the accompanying drawings.

In the drawings:

FIG. 1 is a diagram of an axial section of an elementary device using the principle of this invention;

FIG. 2 shows a section along the plane II—II of FIG. 1;

FIG. 3 is an exploded view of the device of FIG. 1;

FIG. 4 is a plan view of the segment used in the device of FIGS. 1 to 3;

FIG. 7 shows a radial section along the plane VII—VII of FIG. 6 of a particular configuration of the assembly;

FIG. 8 shows a detail of the implementation of the sleeve coated with a friction material;

FIG. 9 is a plan view of a possible configuration of the segment;

FIG. 10 shows, as in FIG. 6, another embodiment;

FIGS. 11 and 12 are cross-sectional views, as in FIG. 7, of other possible assemblies;

FIG. 13 shows an axial section, as in FIG. 6, of another embodiment in which it is possible to modify the damping force;

FIG. 14 is a sectional view along the line XIV—XIV of FIG. 13;

FIG. 15 shows an example of the application of a device according to this invention to the damping of the vibration of a tube or conduit.

Figure 5:
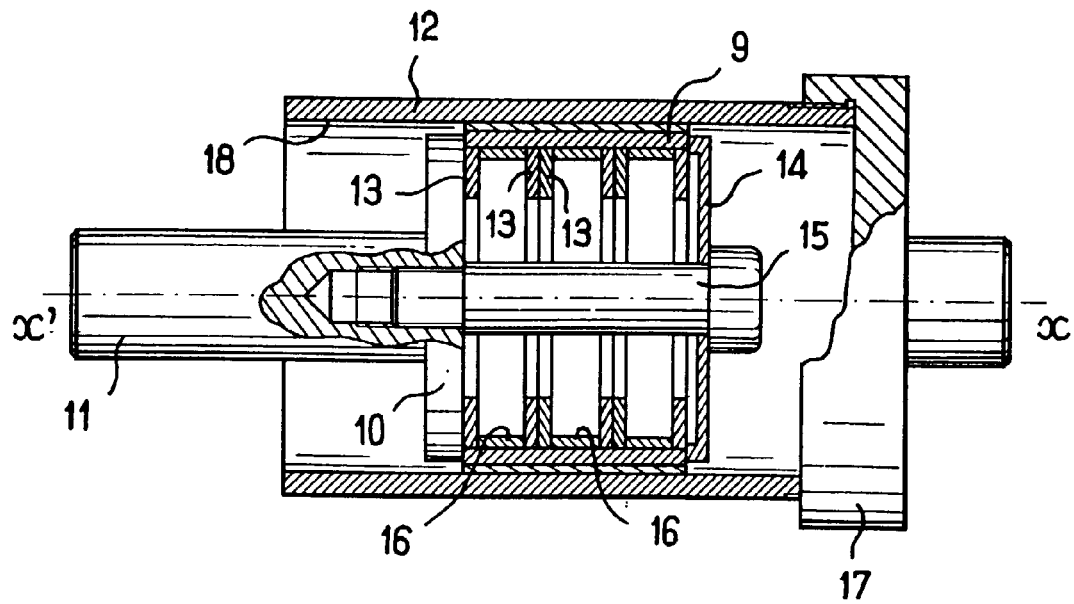
FIG. 5 shows an axial section of a device with several segments designed according to the invention.

The operating principle of this invention will now be described in reference to FIGS. 1 to 4.

The device such as sketchily represented here consists of three elements, a first cylindrical part 1 that slides inside a second cylindrical part 2 with between them a segment 3 integral in translation with said part 1 and that comes to rub against the inner cylindrical surface of said part 2. As shown more clearly in FIG. 3, the part 1 comprises a ring groove 4 that receives the segment 3, itself split in 5 as shown more clearly in FIG. 4. Said segment 3 is sized so as to forcibly bear against the inner wall 6 of the part 2. This segment 3, as well as the parts 1 and 2, can be made of steel, for instance. The part 1 comprises at its end that slides inside the part 2 a head 7 forming guiding piston parallel to the axis x'x of the device. Lastly, the part 2 is designed with an expanded flange 8 to allow for its fixation to a support [not represented].

Assuming that the part 1 is the one connected to the system to be damped (carriage, tubing liable to vibrate, etc.) and that the part 2 is the one connected to the damping structure (stopper, fixation wall, etc.), the damping is performed by the friction motion of the segment 3 against the inner wall 6 or the part 2. The damping force is of course a function of the pressure applied by the segment 3 on the wall 6 and of the friction coefficient between said segment and said wall. If the segment 3 is mounted without axial play or side clearance inside the groove 4 of the receiving part 1, the damping will take place immediately because of the great axial rigidity of the system, and such damping is independent of both the temperature and the speed of the motion to be damped between the parts 1 and 2.

Concretely, for a good operation of this device and for an easy and precise adjustment of the system, the segments axially integral with the first part will not act directly on the wall of the second part, but instead will do so through another element comprising at least one coating of a suitable friction material.

It is also possible, even in the case of great damping forces, to use only one segment, wide enough (parallel to the axis of the parts in relative motion) and, if need be, to shorten somewhat the machined segment if the effort applied is too great, or to add to said segment one or several auxiliary segments if the effort applied is too small. The wide segment may advantageously be designed with, on its friction face, a coating of a suitable friction material; its action is equivalent to that of several thin segments, the sum of their widths being equal to that of the wide segment.

What follows now is a first suitable concrete embodiment as per FIG. 5.

According to this embodiment, the device comprises, integral with the first part 11, a number of segments 13 that develop a radial expansion force upon an intermediary element 9 in the shape of a sleeve split from one edge to the other, for instance in a way parallel to the axis x'x of the device or else helical. The element 9, that advantageouly displays on its outer face a suitable friction coating, comes to bear on the inner cylindrical surface of the second part 12 in which the part 11 slides axially. The part 12 may be made, for instance, of a steel of suitable quality, or else of any material, particularly a resistant enough composite of which the working surface can, if need be, be subjected to a suitable surface treatment.

As can be seen on FIG. 5, the segments 13 are set integral to the part 11 by being pressed against the shoulder 10 of the part 11 by means of a cover 14, made for instance of rigid steel, and of a bolt 15 screwed along the axis x'x of the device inside the part 111 and the shoulder 10. This assembly is completed with the spacing rings 16. In the example shown, six segments 13 are spaced by three rings 16.

In the example shown in FIG. 5, the second part 12 is closed at one end by a cap 17 that can, for instance, be screwed into said end, the damping system thus operating in a functional way as a friction cylinder. The frictional force of the sleeve 9 inside the cylindrical bearing surface 18 of the part 12 is a function of the friction materials used for the sleeve 9 and for the bearing 18, of the number of the segments 13 integral to the part 11 and of the expansion force of each segment that tends to apply the sleeve 9 against the surface 18 of the part 12.

Figure 6:
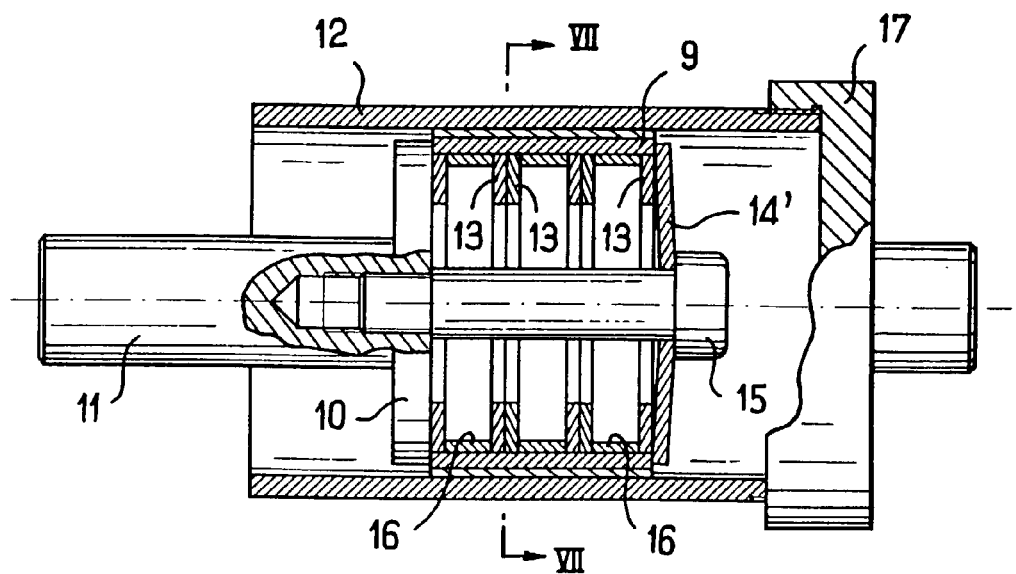
FIG. 6 shows the device of FIG. 5 slightly modified.

In the variation of the embodiment shown in FIG. 6, the same elements as in FIG. 5 are present and are given the same numerical references, except for the rigid cover 14 that is replaced with an elastic washer 14' of which the axial load is nonetheless designed to be greater than the maximum friction force susceptible to be developed by the device, so as to avoid any side clearance between the segments and the part 11. Said washer facilitates the assembling by allowing to disregard any small difference in size that may appear regarding the thickness of the segments relatively to the size of the spacers and of the axial length of the sleeve 9, and in allowing for a perfect axial blocking of the friction sleeve 9 vis-à-vis the part 11.

In the two examples of assembling shown in FIGS. 5 and 6, the segments 13 are thus enclosed in, and integral with, the part 11 inside a sort of housing consisting of the shoulder 10, the cover 14 or the washer 14' and the sleeve 9.

FIG. 7 shows more precisely the assembly of a segment 13 inside the sleeve 9 that comes to rub against the inside of the part 12.

Firstly, as appears more clearly in FIG. 8, the sleeve 9 is advantageously made of a metal sleeve proper 19, made of steel for instance, coated on the outside with a friction coating 20, for instance a polytetrafluoroethylene loaded with metal particles, or a metallic friction material of suitable quality, or else, as already mentioned, any suitable material as to its mechanical resistance, particularly a composite material having undergone a suitable surface treatment.

As illustrated, the shape of the segments used here has advantageously a section that increases from the open end of the segment to its center, so as to provide, as is known in the art, the application of a pressure force as constant as possible on the whole span of the segment. The open ends of the segment are designed with ears, to facilitate the assembling. FIG. 9 shows a single segment 13 in plan view.

FIGS. 5 and 6 show devices in which the segments were mounted on the outside of a first part forming a sort of piston and integral with said part and on which they applied a sleeve mounted frictionally on their outside inside a second part forming a sort of cylinder.

A somewhat reversed solution will now be described, referring to FIG. 10. Here the segments are mounted inside a first part, itself in the basic shape of a cylinder, integral with said part, and the segments apply a sleeve that bears frictionally on the outside of a second part in the basic shape of a piston.

According to the embodiment in FIG. 10, the device comprises, integral with a first part 21, a number of segments 23 that exert a radial compression force upon an intermediary element 24 in the shape of a sleeve split from edge to edge, e.g. in a way parallel to the axis x'x of the device or else helical. The part 24, advantageously designed with a suitable friction coating on its inner face, comes to bear against the cylindrical outer surface of the second part 25 on which the first part 21 slides axially. The parts 21 and 24 can be made, for instance, of steel of suitable quality.

As with the embodiments of FIGS. 5 and 6, the segments 23 are positioned integral with the part 21 and pressed against the shoulder 26 of said part by means of an elastic washer 27, itself leaning against a cap 28, made of steel for instance, screwed in the end of the part 21. As in FIG. 6, the axial compression force developed by the washer 27 on the system must be greater than the maximum frictional force that the device can stand, so as to prevent any side clearance between the segments 23 and the part 21. In the example illustrated, six segments 23 were used, spaced by three rings 29. In such an assembly, it is clear that, here again, the segments 23 are somehow enclosed in a housing consisting of the shoulder 26, the washer 27 leaning against the cap 28 and the sleeve 24. On its other end opposite the cap 28 is mounted another cap 30 on the part 21 that closes it at that end, the resulting system looking like that of FIG. 6 in the shape of a friction damping cylinder.

FIG. 11 shows another possible assembly of the device.

FIG. 11 shows, in cross section and similarly to FIG. 7, a segment 33 that comes to rub against the inner surface of a cylindrical circular part 32, said segment 33 being integral with a first part 31 forming piston sliding inside the part 32. As in FIG. 6, several segments may be mounted in sequence with suitable spacing, or else stacked upon one another, and firmly fastened to the piece 31 by means of a bolt 35. Nonetheless, contrary to the embodiments of FIGS. 6 and 7, there is no need for an intermediary sleeve such as 9, the segments 33 bearing directly on the inner surface of the second part 32. Yet the segments 33 are advantageously designed, on their outer face that comes to abut frictionally on the inner surface of the part 32, with a suitable friction coating 36.

As in FIG. 11 and as already described, the segments 33 are advantageously designed with a section that goes increasing from their opening end to the center so as to ensure a pressure force essentially constant on their whole surface. In other words, this assembly operation is close to the operating principle shown in FIGS. 1 to 4.

In the variation shown in FIG. 12, the arrangement is the same as that of FIG. 11, but with the addition, inside the segments 33, of additional segments 37 designed, too, with a tapered section configuration. Here, the segments 33 develop a tapered-section friction, and the addition of the complementary segments 37 enables to adjust more precisely the contact pressure with the cylindrical tubular part 32.

In the variation of FIGS. 13 and 14 are shown the general means of such devices as already described, i.e. a piston 41 forming the first part of the device, sliding frictionally inside a cylinder 42 forming the second part of said device. The friction is obtained by means of segments 43 (9 of them in the exemple shown) suitably spaced by the rings 44 and tightly press-fitted and immobilized in axial translation between an end circlip 45 and a washer 46 that applies on the first ring 44 (on the right in the drawing) a force greater, for the reasons already mentioned, than the maximum friction force to which the device will be subjected, thus blocking in axial translation the friction sleeve 47 against the piston 41. As for the segments 43, they apply a radial expansion force on the sleeve 47, advantageously split and preferably designed with a coating 48 made of a friction material of suitable quality, that comes to bear against the inner surface of the cylindrical part 42. Each segment 43 displays at its opening end, as seen more clearly in FIG. 14, a straight arm, respectively 43a and 43b, tilted away from each other and between which is a cam 49 with an elliptical section that rotates around an axis 50 integral with the part 41, and that can be actuated by means of a knurled knob 51. The action of the cam 49 generates, when positioned as shown in FIG. 14, a flexion moment at the level of the opening of the segments 43; this flexion moment causes a decrease in diameter of the segments 43, thus decreasing and even possibly cancelling the effort developed by the segments inside the friction elements 47, 48.

The arrangement in FIGS. 13 and 14 thus enables to change the frictional force, i.e. the device damping force, and possibly to cancel it altogether.

Referring now to FIG. 15, the following description relates to an application of the device of this invention to the damping of a tube or conduit. The damping device of this invention, referenced as a unit in 52, will not be described, since It can be of any type described in the previous drawings. Said device appears overall as a friction-action cylinder and is fastened at one of its ends, for instance in 53, by means of a ball-and-socket joint to a wall 54 or to any other resistant support structure. The device's other end 55 is also fastened by means of a collar 56 that circles the conduit 57 of which the vibrations must be damped. In order for the device to be efficient, it must be ascertained that there is no clearance at the level of the fixation at each end of the clamping device and at the level of the fixations to the resistant structure 54 and to the tube 57.

A practical embodiment was implemented with the following characteristics:

stroke of the damping device: ±10 mm.

braking force: adjustable from 80N to 380N depending on the number of segments in use, overall dimensions: outer diameter ≅40 mm, Inner diameter of the frictional element ≅28.5 mm, inner length of the frictional element ≅20 mm.

The segments were made in a 1.5-mm thick sheet of cupro-beryllium

The frictional force measured in Newton (N) is as indicated in the following table, as well as the length of the frictional element occupied by the segments.

| Frictional force (N) | Number of segments | Length occupied by the segments |
| --- | --- | --- |
| 80 | 3 | 4.5 |
| 230 | 8 | 12 |
| 380 | 13 | 19.5 |

Of course, this invention is not limited to the embodiments illustrated herewith that were only given as examples.

In particular, various options for the adjustment of the frictional force can be provided by gradual action of a mechanical or hydraulic control that opens or closes the segments, by resorting to a cam controlled in rotation, as illustrated in FIG. 14, or to a cam controlled in translation [not represented] or by switches mechanically or hydraulically controlled.

Likewise, although the illustrated embodiments were implemented with circular cylindrical shapes for the first and second parts, other somewhat flatter non-circular sections, elliptical for instance, may be adopted.

The invention claimed is:

1. A process for damping motion, damping vibrations or absorbing shocks between two cylindrical parts up to a maximum frictional force, one part sliding inside the other part in frictional translation, said process including:

applying a radial force, developed radially perpendicularly to a relative translation of an inner cylindrical part and an outer cylindrical part, by a plurality of split elastic segments, encircling the inner cylindrical part and having an axial rigidity that develops quickly in opposition to the translation, through a split friction sleeve, disposed between the plurality of elastic segments and the inner cylindrical part, having an inner face including a friction coating that bears against an outer surface of the inner cylindrical part;

wherein the radial force is an essentially constant radial compression force applied to the split friction sleeve by the plurality of elastic segments, and wherein the plurality of elastic segments are distributed axially along the inner cylindrical part using spacer rings.

2. A process according to claim 1, wherein the plurality of elastic segments are integrally positioned with the outer cylindrical part and pressed against a shoulder of the outer cylindrical part by an elastic washer, the elastic washer leaning against an end cap screwed in an end of the outer cylindrical part, wherein an axial compression force developed by the elastic washer is greater than a maximum frictional force that the device can stand to prevent side clearance between the plurality of elastic segments and the outer cylindrical part.

3. A process according to claim 2, wherein another cap, located opposite the end cap, closes a housing including the shoulder, the washer, the friction sleeve and the outer cylindrical part.

* * * * *